United States Patent [19]

Ogawa

[11] Patent Number: 5,608,490
[45] Date of Patent: Mar. 4, 1997

[54] APPARATUS FOR AND A METHOD OF COMMUNICATING BETWEEN A CAMERA AND EXTERNAL EQUIPMENT

[75] Inventor: Hidehiro Ogawa, Funabashi, Japan

[73] Assignee: Nikon Corporation, Tokyo, Japan

[21] Appl. No.: 493,233

[22] Filed: Jun. 20, 1995

[30] Foreign Application Priority Data

Jun. 20, 1994 [JP] Japan .................................. 6-136990

[51] Int. Cl.$^6$ .............................. G03B 9/00; G03B 17/00
[52] U.S. Cl. ........................... 396/300; 396/429; 396/529
[58] Field of Search ..................... 354/62, 412; 358/906, 358/909.1; 348/552; 352/286

[56] References Cited

U.S. PATENT DOCUMENTS

| | | | |
|---|---|---|---|
| 4,991,184 | 2/1991 | Hashimoto | 375/8 |
| 5,132,716 | 7/1992 | Samuels et al. | 354/322 |
| 5,227,835 | 7/1993 | Anagnostopoulos | 354/412 |
| 5,278,604 | 1/1994 | Nakamura | 354/412 |
| 5,363,164 | 11/1994 | Kobayashi et al. | 354/195.1 |
| 5,481,326 | 1/1996 | Yasukawa | 354/286 |

*Primary Examiner*—Safet Metjahic
*Assistant Examiner*—Michael Dalakis

[57] ABSTRACT

A camera system including a camera which performs data communication with external equipment. The external equipment is connected to a communication terminal in the camera via a connector, such as a cable. The camera and the external equipment initially perform communication at a predetermined initial communication speed via the communication terminal and cable. The camera system includes a device to transmit a communication speed change command to the camera at the initial value of communication speed, and a device to change the initial value of communication speed to a high speed based upon the received communication speed change command. The camera system further includes a device to restore the communication speed to the original initial value of communication speed by generating a communication end command which is transmitted to the camera during communication with the external equipment.

14 Claims, 3 Drawing Sheets

APPARATUS FOR AND A METHOD OF COMMUNICATING BETWEEN A CAMERA AND EXTERNAL EQUIPMENT

BACKGROUND OF THE INVENTION

1. Field of the Invention

The present invention relates to an apparatus for and a method of performing communication with external equipment connected to a camera system via a communication terminal, and, more particularly, the present invention relates to an apparatus for and a method of adjusting communication speed between the camera and external equipment.

2. Description of the Related Art

Cameras have recently become available which can be connected to external equipment, such as electronic system notebooks and the like, to communicate with the external equipment. While communicating with the external equipment, the camera performs operations such as photometry, shutter release and setting of various camera information, such as exposure mode and shutter speed, in accordance with commands received from the external equipment. Further, stop values and the various camera information may be set by the external equipment and written to the camera body for storage therein. Thus, the data of various types of cameras can be retained in the external equipment. In the above-described type of camera system, the transmission of data between the camera and the external equipment is performed according to previously fixed communication speeds. However, because the communication speed between the camera and the external equipment is fixed, the following problems result.

Specifically, when a communication cable connecting the camera and the external equipment is long, communication errors frequently arise when the speed of data communication with the external equipment is fixed at a high speed. Furthermore, when the communication speed is fixed at a low speed to eliminate the communication errors which arise at the high communication speed, the time required for communication with the external equipment becomes long.

SUMMARY OF THE INVENTION

Accordingly, it is an object of the present invention to provide a camera which performs data communication with external equipment.

It is a further object of the present invention to provide a camera which performs data communication with external equipment, while shortening the communication time between the camera and external equipment and reducing or eliminating the occurrence of communication errors.

Objects and advantages of the present invention are achieved with a camera system including a camera and external equipment connected, via a cable or like connector, to a communication terminal in the camera. The camera and the external equipment initially perform communication at a predetermined communication speed via the communication terminal and cable. The camera system includes a device to transmit a communication speed change command to the camera at an initial value of communication speed, and a device to change the initial value of communication speed based on the received communication speed change command. The camera system further includes a device to restore the communication speed to the initial original value of communication speed by generating a communication end command which is transmitted to the camera during communication with the external equipment.

The camera system in accordance with embodiments of the present invention also includes a device to set an electrical power supply of the camera ON according to the operation of a predetermined operating unit arranged in the camera, and a timer to detect non-operation of the operating unit within a predetermined time after the operation of the operating unit. A device to set the electrical power supply OFF sets the electrical power supply OFF according to time-out of the timer. When the electrical supply is set OFF by the device to set the electrical supply OFF, the next time-communication with the external equipment is performed following the electrical supply being set OFF, the communication commences at the initial value of the communication speed.

The camera system in accordance with embodiments of the present invention also includes a memory to store communication speed information, even when there is no passage of current. The initial value of communication speed is set in the memory when either the electrical power supply is set ON by the device to set the electrical power supply ON, or when the timer times-out.

The camera system in accordance with embodiments of the present invention also includes a speed range setting device to set a speed range of communication performed between the camera and the external equipment, and a device to send a speed change impossible signal to the external equipment when a communication speed change command received by the camera is outside the range of communication speed set by the speed range setting device.

Objects and advantages of the present invention are also achieved in accordance with embodiments of the present invention with a method of communication between a camera and external equipment, the method including setting an initial value of communication speed, transmitting to the camera a communication speed change command, the camera receiving the communication speed change command, and changing the communication speed between the camera and the external equipment.

The method in accordance with embodiments of the present invention further includes transmitting to the camera an equipment type confirmation command when the external equipment commences communication with the camera, returning an equipment type identification signal as a reply to the equipment type confirmation command, confirming the equipment type identification signal, and transmitting a communication speed change command to the camera.

The method in accordance with embodiments of the present invention further includes setting a speed range of communication speed, determining whether or not the communication speed set by the communication speed change command is within the set speed range, and, when it is determined that the speed range is outside the set speed range, transmitting a speed change impossible signal to the external equipment, and not performing a change of communication speed.

Thus, in accordance with embodiments of the present invention, the camera and external equipment communicate at an initial value of communication speed. A communication speed change command is transmitted from the external equipment to the camera during communication with the camera at the initial value of communication speed; the communication speed is changed in the camera, based on the communication speed change command; and, communication is thereafter performed at the changed communication speed. As a result, the communication time can be shortened, and also the occurrence of communication errors can be eliminated or reduced.

During communication with the external equipment, the communication speed is restored to the initial value upon receipt of a communication end command. As a result, when a new communication is commenced, it is performed at the initial value of the communication speed. Accordingly, communication can be reliably commenced without the occurrence of communication errors, even when a connecting cable is long.

When non-operation of an operating unit for a predetermined time is detected during communication and the electrical power supply of the camera has been turned OFF, the next time communication with the external equipment is performed, the communication is commenced at the initial value of the communication speed. Accordingly, when the electrical power supply of the camera is set ON, the camera commences communication at the initial value of the communication speed. Thus, communication errors due to a difference of communication speed at the time communication is commenced are eliminated.

Further, after either non-operation of the operating unit for a predetermined time has been detected, or when the electrical power supply is set ON, the initial value of communication speed is set in the memory. Accordingly, if the electrical power supply of the camera is set ON, the communication speed information can be set with certainty until the commencement of communication with the external equipment.

When the communication speed change command which has been received from the external equipment is in a speed range outside the range of communication speeds which has been set, a speed change impossible signal is transmitted to the external equipment. As a result, the communication speed between the camera and the external equipment can be made to agree closely, and communication errors based on the difference of communication speed can be prevented.

When the external equipment commences communication with the camera, the equipment type confirmation command is transmitted to the camera, and on confirming an equipment type identification signal transmitted from the camera, the communication speed change command is transmitted. As a result, the external equipment can identify, before commencement of communication, the equipment type to which the communicating camera conforms, and the efficiency of the communication can accordingly increase without communication errors arising.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
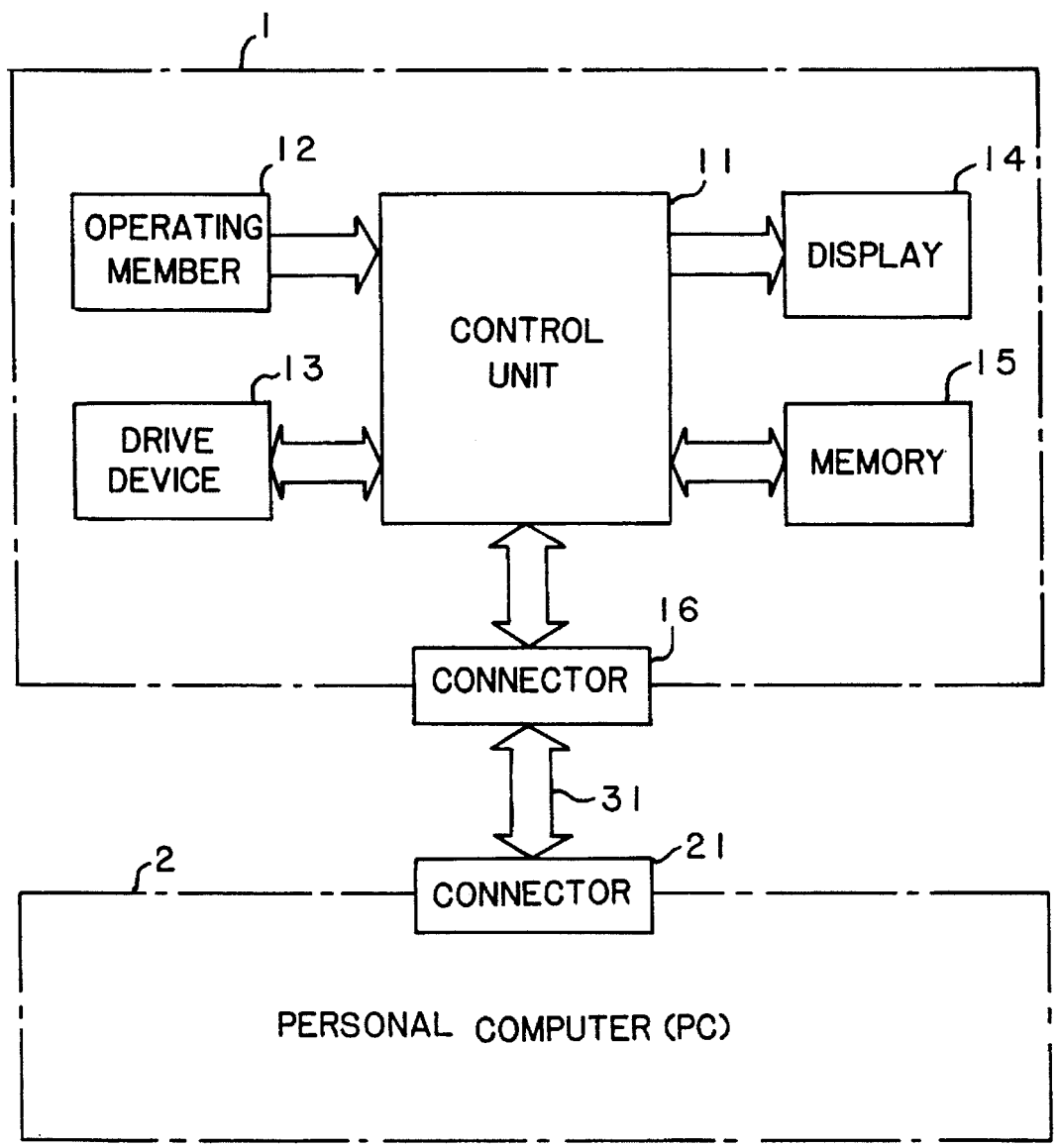
FIG. 1 is a block diagram of a camera system in accordance with embodiments of the present invention.

Reference will now be made in detail to the present preferred embodiments of the present invention, examples of which are illustrated in the accompanying drawings, wherein like reference numerals refer to like elements throughout.

FIG. 1 is a block diagram of a camera system in accordance with embodiments of the present invention. The camera system includes a camera 1 and a personal computer ("PC") 2 connected to the camera 1. Although FIG. 1 shows a personal computer connected to the camera 1, it will be recognized that various types of external devices or external equipment may be connected to the camera. As shown in FIG. 1, the camera 1 includes a control unit 11 which controls the camera operations. The control unit 11 may be a microcomputer, microprocessor or like control circuitry. The camera also includes an operating member 12, such as a release button, used to initiate camera operations; a motor, solenoid or like drive device 13; a display 14 which may be an LCD or similar display; a memory 15 which may be an EEPROM or like memory; and a communication connector 16 or the like for communication with external devices. The camera 1 further includes a speed range setting device which sets a range of communication speed between the camera and the external device. The setting of the speed range is determined by the specification of the camera.

The PC 2 is shown schematically in FIG. 1, and may include a microcomputer, a memory device, an external memory device, a keyboard, and a display device, or like components generally associated with personal computers. The PC 2 includes a communication connector 21 for communication with other devices. The communication connector 21 may be, for example, a connector which can send and receive RS-232C standard serial signals.

The communication connector 16 of the camera 1 and the communication connector 21 of the PC 2 are connected by a communication cable 31, and transmission of signals between the camera 1 and the PC 2 is performed via the communication cable 31 in a so-called UART transmission mode. The range of the communication speed (baud rate) in the above-described transmission mode is, for example, from 300 bits per second (bps), the possible transmission of 300 bits in one second, up to 19,200 bps, the possible transmission of 19,200 bits in one second.

The setting of photometry, exposure mode, shutter speed or like information, and shutter release, can be performed by commands communicated to the camera 1 from the PC 2. Moreover, while the PC 2 communicates with the camera 1, the PC 2 can extract stop values or any of the above-described types of information which have been set and stored in the memory 15 of the camera 1, to preserve this data in a memory device of the PC 2.

Figure 2:
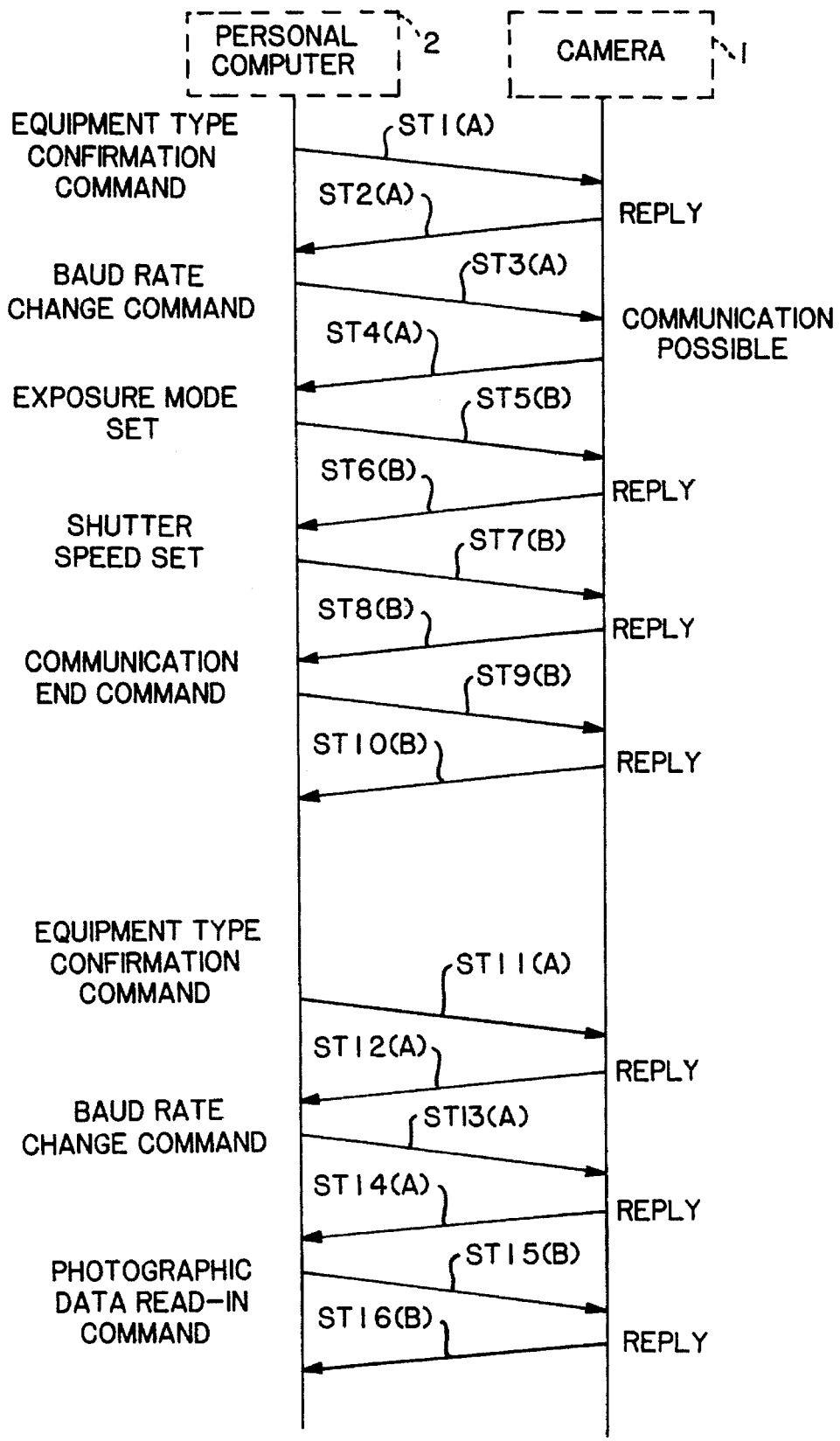
FIG. 2 is a sequence diagram showing communication operations between external equipment and a camera in the camera system in accordance with embodiments of the present invention.

FIG. 2 is a sequence diagram showing communications operations between the PC 2 and camera 1 in accordance with embodiments of the present invention. More specifically, FIG. 2 is a sequence diagram showing the communication protocol performed between the camera 1 and the PC 2 via the communication cable 31. In FIG. 2, the symbols A and B in parentheses in each step represent the state of the baud rate of the respective transmitted signal in each step. Specifically, A denotes the initial value, for example, a comparatively slow baud rate of 300–1,200 bps, and B denotes a changed, comparatively fast baud rate, for example, 4,800–19,200 bps.

Beginning in step ST1, the PC 2 transmits an equipment type confirmation command to the camera 1. The equipment type confirmation command is a command to confirm whether or not the camera 1 is of an equipment type which is compatible with the software operating in the PC 2. Further, the equipment type confirmation command is transmitted to the camera 1 at an initial baud rate value which corresponds to a comparatively low transmission speed. When the equipment type confirmation command is received by the camera 1, the camera 1 transmits (step ST2) its own equipment type as a reply signal to the PC 2, at a similarly low baud rate.

When the PC 2 determines that the equipment type of the camera 1 is compatible with the software in operation, the PC 2 transmits to the camera 1 (step ST3) a baud rate change command at the baud rate corresponding to the initial baud rate value. The baud rate information required for the camera 1 is contained in the baud rate change command.

When communication is possible at the baud rate set by the baud rate change command, the camera 1 transmits a change possible reply signal indicating that communication is possible at the baud rate contained in the baud rate change command (step ST4). However, if the baud rate set by the baud rate change command is determined to be outside the range of communication speed set by the camera speed range setting device, a change impossible reply signal is sent to the external device indicating that the communication speed set by the baud rate change command is outside the range of communication speed set by the speed range setting device, and that communication speed change is impossible.

Upon receiving the reply signal from the camera 1 indicating that communication is possible at the baud rate as changed by the baud rate change command, the PC 2 transmits (step ST5) at the changed baud rate a command to change camera information. For example, as shown in FIG. 2, the PC 2 may transmit a command to change the setting of the exposure mode of the camera 1, causing the setting of the exposure mode to change.

Therefore, the baud rate of the camera 1 is set to the baud rate information received in the baud rate change command in step ST3. Accordingly, the transmission of the exposure mode setting command in step ST5, and the transmission of a reply signal to the exposure mode setting command in step ST6, are thereafter performed at the changed baud rate.

Continuing, in step ST7, the PC 2 transmits, for example, a shutter speed setting command to the camera 1 at the changed baud rate. The camera 1 receives the shutter speed setting command, sets the shutter speed and transmits a reply signal to the PC 2 (step ST8).

When the PC 2 has no further camera operation command to be transmitted to the camera 1, a communication end command is transmitted to the camera (step ST9). The camera 1 then transmits (step ST10) a reply signal to the communication end command transmitted in step ST9. The baud rate of the camera 1 returns to the initial baud rate value upon receipt of the communication end command.

When the PC 2 again communicates with the camera 1 (and similarly when the PC 2 communicates with another camera) in step ST11, the PC 2 transmits an equipment type confirmation command for a second time to the camera 1. The equipment type confirmation command transmitted in step ST11 is transmitted at the initial baud rate used in communication. In step ST12, the camera 1 transmits its own equipment type as a reply signal identifying the camera 1. If the PC 2 determines that the reply signal transmitted in step ST12 is compatible with the PC's software, the PC 2 transmits a baud rate change command for a second time to the camera 1 (step ST13). A reply signal to the baud rate change command is returned from the camera 1 (step ST14) and received by the PC 2, and in step ST15 the PC 2 transmits a photographic data read-in command to the camera 1 at the changed baud rate. When the camera 1 receives the photographic data read-in command at the changed baud rate, the camera 1 reads out the photographic data stored in the memory 15, and in step ST16 returns the photographic data at the changed baud rate as a reply signal to the PC 2.

In accordance with the above-described embodiments of the present invention, the changed baud rate is returned to the initial baud rate value by a communication end command from the PC 2. However, the baud rate may also be returned to the initial value when the electrical supply to the camera 1 is set OFF.

Specifically, in accordance with embodiments of the present invention, an electrical power supply is introduced to the camera by a half depression of a release button included in the operating unit 12. After the half depression of the release button, the electrical power supply is set OFF in the camera 1 when other operations have not been performed within a predetermined time set by a timer, for example, an eight (8) second timer. In this case, the baud rate is set to the initial baud rate value when the eight (8) second timer has timed out and the electrical power supply is set OFF. The baud rate is also set to the initial baud rate value by half depression of the release button when the electrical power supply is introduced, such that communication with the PC 2 is commenced at the initial value of the baud rate.

Thus, in accordance with the embodiments of the invention described above, when performing communication between the camera 1 and external equipment, the equipment type confirmation command and the baud rate change command are transmitted at a comparatively low baud rate, and, thereafter, communication speed is changed such that data is transmitted at a high baud rate.

The baud rate is changed because changing the baud rate makes it possible to select a communication speed which is optimum for the system. In particular, in the case that communication is reliable, the communication time is shortened by making the communication speed fast, and, in the case that communication is not reliable, the communication speed is made slow such that communication can be reliably performed.

For example, when the equipment connected to the camera 1 is ambiguous, communication can be reliably performed by making the communication speed slow at the beginning of transmission. After starting with a slow communication speed, if it is determined that the equipment is a type with which communication is reliable, the communication speed may be increased using the baud rate change command. After the end of the necessary communication, the communication speed can be set back to the original, initial baud rate value. At the time of a next communication between the external equipment and the camera 1, data communication is performed at the initial baud rate value. Accordingly, communication can be reliably commenced without communication errors.

Further, during communication between the camera 1 and the PC 2, the reliability of communication is high when the length of the communication cable 31 is short. Accordingly, the communication speed can be set to a high speed, and the communication time can be shortened. Further, when the communication cable 31 is long, the transmitted signal waveform becomes corrupted, and the reliability of communication is low. However, when the communication cable 31 is long, communication can be reliably performed if the communication speed is slow.

Accordingly, if the PC 2 is connected to the camera 1 by a cable or the like by which high speed communication is impossible, communication errors may arise if the baud rate is changed to a high speed baud rate. Specifically, when a baud rate change command is transmitted at a low speed baud rate from the PC 2 to the camera 1, and the camera 1 responds to the baud rate change command by increasing the baud rate to a high speed, as a result a command next transmitted from the PC 2 at a high speed baud rate may not be received. Therefore, during communication between the camera 1 and the PC 2, it is advantageous to know the type of cable or communication means by which the PC 2 is connected to the camera 1.

Figure 3:
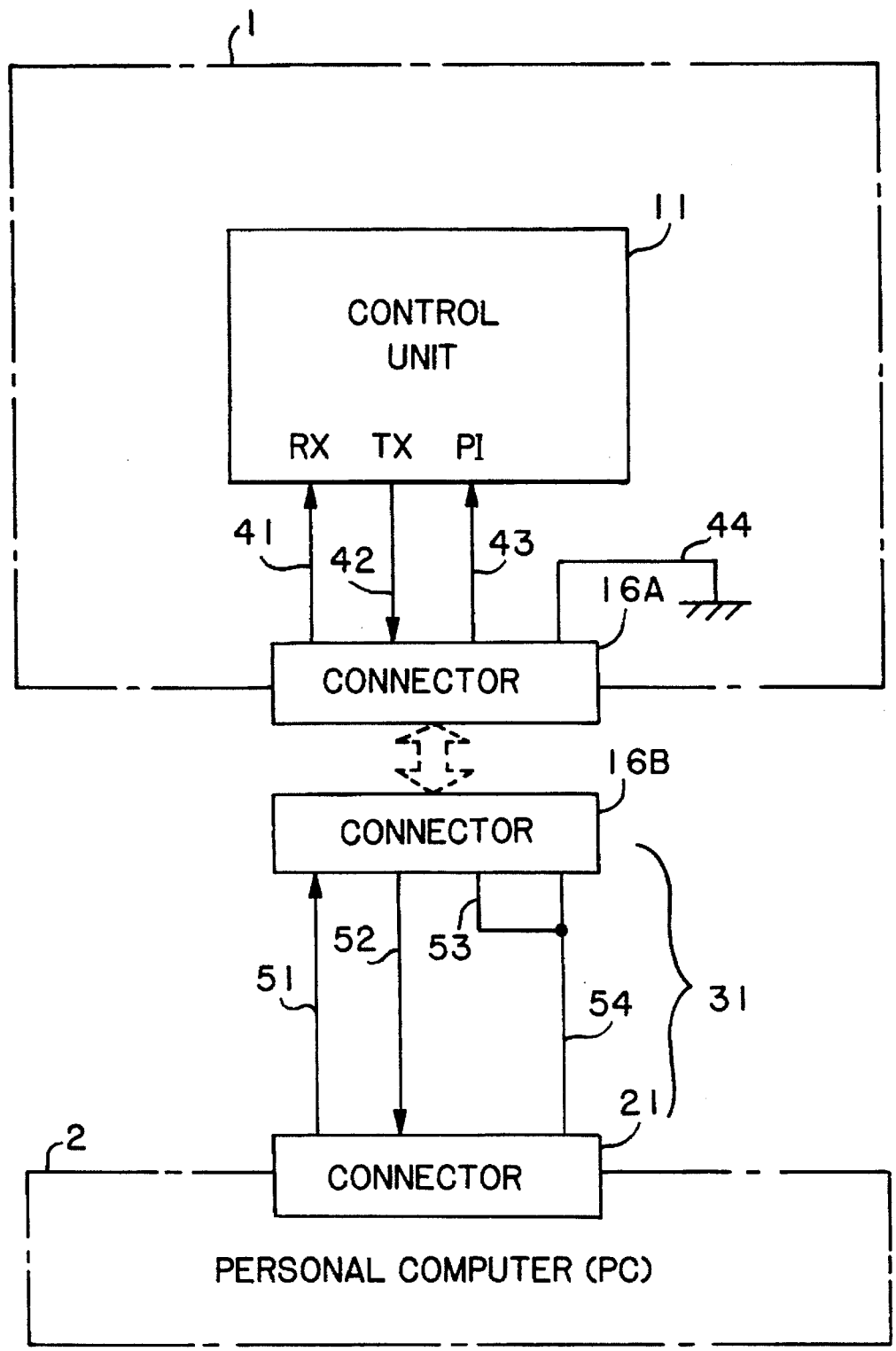
FIG. 3 is a block diagram showing the connection of communication leads between external equipment and a camera in a camera system in accordance with the present invention.

FIG. 3 is a block diagram showing a device which can identify a cable by which high speed communication is impossible. More particularly, FIG. 3 shows the connection of communication leads between the PC 2 and the camera 1 in an identification device arranged between communication connector 16 of the camera 2 and the communication cable 31.

As shown in FIG. 3, a lead 41 joins a communication connector 16A of the camera 1 and a receiving terminal RX of the control unit 11; a lead 42 joins the communication connector 16A and a transmitting terminal TX of the control unit 11; a lead 43 joins the communication connector 16A and an input port PI of the control unit 11; and a lead 44 connects a ground terminal of the communication connector 16A to a grounded portion of the camera 1.

The communication cable 31 includes respective leads 51–54. The leads 51 and 52 are connected, via the communication connector 16B and the communication connector 16A, inserted in communication connector 16B, and respective leads 41 and 42, to the RX terminal and the TX terminal, respectively, of the control unit 11. The lead 53 connects to the input port PI of the control unit 11 via the communication connectors 16A and 16B and the lead 43. The lead 54 is connected to a grounded terminal of the camera 1 (specifically, the grounded terminal of the communication connector 16A). Further, the lead 53 is connected to the grounded lead 54.

The ground potential is thus input as a logic level low "L" signal to the input port PI of the control unit 11. Further, if the lead 53 is not connected to the lead 54, a logic level high "H" signal is input to the input port of the control unit 11.

Thus, when the camera 1 and the PC 2 are connected with a long cable by means of which high speed communication is impossible, the input port PI of the control unit 11 connects to the lead 53 and the input port PI is at the "L" level. When the camera 1 and the PC 2 are connected by a short cable by means of which high speed communication is possible, the input port PI of the control unit 11 does not connect to the lead 53 and the input port PI is at the "H" level. If the communication cable 31 is connected between the camera 1 and the PC 2, the control unit 11 can discriminate, based on the level of the input port PI, whether or not high speed communication is possible.

More particularly, when a baud rate change command has been received from the PC 2, if the level of the input port PI is the "H" level, the control unit 11 of the camera 1 returns a reply signal to the PC 2, indicating that the baud rate can be changed. From the time that the reply signal is received, communication with the PC 2 is performed at the changed baud rate. Moreover, if the input port PI level is the "L" level, a signal indicating that a baud rate change is impossible is returned as the reply signal to the PC 2. In this case, the PC 2 does not change the baud rate used in the communication with the camera 1.

In the above-described manner, when a cable is connected between the camera 1 and the PC 2 by means of which high speed communication is impossible, high speed communication is not performed, and low speed communication is performed with high reliability.

Moreover, as shown in FIG. 3, by inputting one of two levels, "L" and "H", to the input port PI of the control unit 11, it is determined whether or not high speed communication is possible. However, by using plural input ports, or by using plural levels separated in an analog manner between the levels "L" and "H", a range of three or more communication speeds may be selected from.

In accordance with above-described embodiments of the present invention, external equipment communicating with a camera transmits information at an initial low communication speed. When a communication speed change command is transmitted to the camera, the communication speed is changed at the camera based on the communication speed change command, and thereafter the communication with the external equipment is performed at the changed communication speed. Accordingly, the communication time can be shortened, and also the occurrence of communication errors can be prevented.

Further, in accordance with embodiments of the present invention, since the communication speed is restored to its initial value upon receipt of a communication end command during communication with the external equipment, at the time of commencement of a new communication, the new communication is performed at a low communication speed. Accordingly, when communication is commenced with the external equipment connected by a long cable, communication can be reliably commenced without communication errors arising.

Still further, in accordance with embodiments of the present invention, because the electrical supply of the camera is set OFF when the non-operation of an operating unit is detected for a predetermined amount of time, the next time communication with the external equipment is commenced, the communication speed is set at the initial value. Additionally, when the electrical power supply of the camera is set ON, the camera commences communication at a low speed. Accordingly, communication errors can be reduced when the electrical power supply is set ON and communication is commenced.

Moreover, since the camera includes a memory to store communication speed information indicating the initial value of communication speed, the communication speed information can be set, either after detection of the non-operation of the operating unit for a predetermined time, or when the electrical power supply is set ON. Accordingly, the communication speed information can be set with certainty until the commencement of communication with the external equipment.

Furthermore, in accordance with embodiments of the present invention, when a communication speed change command received from the external equipment is determined to be outside a range of set communication speeds, change impossible signal is returned to the external equipment. Accordingly, the speed of communication with the external equipment will conform to the type of equipment, and communication errors based on differences of communication speed between equipment can be prevented.

Moreover, in accordance with embodiments of the invention, when an external equipment commences communication with the camera, firstly, an equipment type confirmation command is sent to the camera. Secondly, on confirming that an equipment type identification signal is returned from the camera, because a communication speed change command is then transmitted, the external equipment can discriminate, before the commencement of communication, the type camera with which the external equipment communicates. Accordingly, the efficiency of communication can be increased.

Although a few preferred embodiments of the present invention have been shown and described, it would be appreciated by those skilled in the art the changes may be made in these embodiments without departing from the principles and spirit of the invention, the scope of which is defined in the claims and their equivalents.

What is claimed is:

1. A camera system, comprising:

a camera including a communication terminal;

an external device connected to the communication terminal of the camera, the camera and the external device performing communication at an initial communication speed via the communication terminal;

a communication speed change command device to transmit a command to the camera to change the initial communication speed; and a communication speed change device to change the communication speed based on the communication speed change command, wherein after the communication speed is changed, communication between the camera and the external equipment is performed at the changed communication speed.

2. A camera system as recited in claim 1, further comprising:

a communication end command transmitting device to transmit a communication end command to the camera; and a communication speed restoring device to restore the initial value of communication speed upon receiving the communication end command.

3. A camera system as recited in claim 1, further comprising:

an operating unit included in the camera;

a device to set the electrical power supply of the camera ON in response to operation of the operating unit;

a timer to detect non-operation of the operating unit for a predetermined time after the operation of the operating unit;

a device to set the electrical power supply OFF when the timer times out; and a communication speed restoring device to restore the initial value of communication speed when the electrical power supply is set OFF by the device to set the electrical power supply OFF, such that a next communication with the external equipment commences at the initial value of communication speed.

4. A camera system as recited in claim 3, further comprising:

a memory to store communication speed information; and a device to set the initial communication speed value in the memory according to one of the electrical power supply being set ON and a time-out of the timer.

5. A camera system as recited in claim 1, further comprising:

a speed range setting device to set a speed range of the communication speed between the camera and the external device; and a speed change impossible determining device to determine when the communication speed change command is outside the range of communication speed set by the speed range setting device and to transmit a signal to the external device indicating that communication speed change is impossible.

6. A camera system as recited in claim 1, wherein the initial value of communication speed is low speed of communication.

7. A communication method of a camera system comprising a camera having a communication terminal and an external device connected to the communication terminal, the camera and external device performing communication via the communication terminal, comprising:

communicating data between the camera and external device at an initial communication speed value;

transmitting to the camera a communication speed change command;

changing the communication speed between the camera and the external device when the camera receives the communication speed change command; and communicating data between the camera and the external device at the changed communication speed.

8. A communication method of a camera system as recited in claim 7, wherein the communicating data at the initial communication speed comprises:

transmitting to the camera an equipment type confirmation command when the external device commences communication with the camera;

generating from the camera an equipment type identification signal in response to the equipment type confirmation command; and confirming that the equipment type identification signal generated from the camera in response to the receipt of the equipment type confirmation command corresponds to an equipment type with which high-speed communication is possible.

9. A communication method of a camera system as recited in claim 7, further comprising:

setting a range of communication speed between the camera and the external device;

receiving the communication speed change command from the external equipment;

determining whether the communication speed of the communication speed change command is within the set communication speed range; and when the communication speed is outside the set communication speed range, transmitting a speed change impossible signal to the external device, and not performing the change of communication speed.

10. A communication method of a camera system as recited in claim 7, wherein the initial value of communication speed is a low speed of communication.

11. A camera system as recited in claim 1, wherein the external device is connected to the communication terminal of the camera via a cable.

12. A system for performing communication between a camera and an external device, comprising:

an equipment type command generator to send an equipment type command to the camera at an initial predetermined baud rate to determine whether the camera is a type which is compatible with the external device;

an equipment type generator to receive the equipment type command from the equipment type command generator, and to confirm that the camera is a type which is compatible with the external device; and a speed change device to send a baud rate change command to the camera to change the initial communication speed when the equipment type generator confirms that the camera is a type compatible with the external device.

13. A system for performing communication between a camera and an external device, comprising:

a camera communication connector via which communication is performed with the external device;

an external device communication connector via which communication is performed with the camera;

a communication device connecting the camera and the external device via the camera communication connector and the external device communication connector;

an equipment type confirmation command generator to send an equipment type confirmation command to the camera at a predetermined initial baud rate to confirm whether the camera is compatible with the external device;

an equipment type generator to receive the equipment type confirmation command and to generate an equipment type command at the predetermined initial baud rate in response to the equipment type confirmation command received from the external equipment; and a communication speed change device to receive the equipment type command from the equipment type generator, to determine if the equipment type of the camera is compatible with the external device and to transmit a command to the camera to increase the initial predetermined baud rate when it is determined that the equipment type of the camera is compatible with the external device.

14. A system as recited in claim 13, further comprising a communication speed change inhibiting device to inhibit changing of the predetermined initial baud rate when the increased communication speed is outside a range of communication speed of the camera.

* * * * *